United States Patent
Bianchi et al.

(10) Patent No.: US 9,851,724 B2
(45) Date of Patent: Dec. 26, 2017

(54) AUTOMATIC TAKE-OFF AND LANDING CONTROL DEVICE

(71) Applicant: Airbus Defence and Space GmbH, Munich (DE)

(72) Inventors: Christiano Bianchi, Munich (DE); Winfried Lohmiller, Freising (DE)

(73) Assignee: Airbus Defence and Space GmbH, Munich (DE)

(*) Notice: Subject to any disclaimer, the term of this patent is extended or adjusted under 35 U.S.C. 154(b) by 118 days.

(21) Appl. No.: 14/940,353

(22) Filed: Nov. 13, 2015

(65) Prior Publication Data

US 2016/0139603 A1 May 19, 2016

(30) Foreign Application Priority Data

Nov. 14, 2014 (EP) .................................. 14003839

(51) Int. Cl.
| | | |
|---|---|---|
| *G05D 1/10* | (2006.01) | |
| *G08G 5/00* | (2006.01) | |
| *G08G 5/02* | (2006.01) | |
| *B64C 39/02* | (2006.01) | |
| *B64D 47/08* | (2006.01) | |

(Continued)

(52) U.S. Cl.
CPC ........... *G05D 1/101* (2013.01); *B64C 39/024* (2013.01); *B64D 47/08* (2013.01); *G01S 19/48* (2013.01); *G05D 1/0653* (2013.01); *G08G 5/0021* (2013.01); *G08G 5/0065* (2013.01); *G08G 5/0069* (2013.01); *G08G 5/025* (2013.01)

(58) Field of Classification Search
CPC .... G05D 1/101; G05D 1/0653; B64C 39/024; B64D 47/08; B64D 5/04; G01S 19/00; G01S 19/15; G01S 19/20; G01S 19/48; G08G 5/065; G08G 5/025; G08G 5/0069; G08G 5/0021; G08G 5/02
See application file for complete search history.

(56) References Cited

U.S. PATENT DOCUMENTS

| | | |
|---|---|---|
| 2,511,733 A | 6/1950 | Morrison |
| 5,945,943 A | 8/1999 | Kalafus et al. |

(Continued)

FOREIGN PATENT DOCUMENTS

| | | |
|---|---|---|
| EP | 1014104 A2 | 6/2000 |
| EP | 2261878 A1 | 3/2004 |

(Continued)

OTHER PUBLICATIONS

European Patent Office, European Search Report for European Patent Application No. 14003839.9 dated May 4, 2015.

*Primary Examiner* — Thomas Ingram
(74) *Attorney, Agent, or Firm* — Lorenz & Kopf, LLP

(57) ABSTRACT

An automatic take-off and landing control device for an aircraft is provided. The control device comprises at least two of at least one local tracking device adapted for receiving at least one local signal from at least one local ground station and for determining a position of the aircraft based on the local signals, at least one GNSS tracking device adapted for receiving a GNSS signal and for determining a position of the aircraft based on the GNSS signal; and at least one camera device adapted for observing an environment of the aircraft and for determining a position of the aircraft based on the camera signal.

14 Claims, 5 Drawing Sheets

(51) Int. Cl.
*G05D 1/06* (2006.01)
*G01S 19/48* (2010.01)

(56) References Cited

U.S. PATENT DOCUMENTS

| | | | |
|---|---|---|---|
| 7,089,092 B1* | 8/2006 | Wood | G01S 19/15 342/33 |
| 2004/0044446 A1 | 3/2004 | Staggs et al. | |
| 2006/0049977 A1* | 3/2006 | Vacanti | G01S 7/006 342/121 |
| 2008/0234882 A1* | 9/2008 | Villaume | G08G 5/0021 701/9 |
| 2011/0106345 A1* | 5/2011 | Takacs | G05D 1/0676 701/17 |
| 2011/0160941 A1* | 6/2011 | Garrec | G01S 13/913 701/17 |
| 2011/0166723 A1* | 7/2011 | Valentova | G05D 1/0083 701/16 |
| 2013/0085629 A1* | 4/2013 | Washington | B64C 13/18 701/15 |
| 2014/0297068 A1* | 10/2014 | Revell | G06K 9/00637 701/16 |
| 2016/0232795 A1* | 8/2016 | Thiele | G05D 1/0022 |

FOREIGN PATENT DOCUMENTS

| | | | |
|---|---|---|---|
| EP | 1860456 A1 | 11/2007 | |
| EP | 2511733 A2 | 10/2012 | |
| EP | 2557552 A1 | 2/2013 | |

\* cited by examiner

AUTOMATIC TAKE-OFF AND LANDING CONTROL DEVICE

CROSS-REFERENCE TO RELATED APPLICATION

This application claims priority to European Patent Application No. 14 003 839.9, filed Nov. 14, 2014, which is incorporated herein by reference in its entirety.

TECHNICAL FIELD

Generally, this relates to a landing and take-off aid or support system for an aircraft. In particular, this relates to an automatic take-off and landing control device for an aircraft, particularly for an Unmanned Air Vehicle (UAV) and/or a Remotely Piloted Aircraft (RPA). The embodiment further relates to an aircraft comprising such a control device and a method for taking-off or landing an aircraft.

BACKGROUND

In addition, other objects, desirable features and characteristics will become apparent from the subsequent summary and detailed description, and the appended claims, taken in conjunction with the accompanying drawings and this background.

Currently, Unmanned Air Vehicles and/or Remotely Piloted Aircrafts have certain drawbacks relating to take-off and/or landing aid or support systems employed therein, because, for example, certain national and international safety requirements may not yet be fulfilled entirely. For instance, an instrument landing system or microwave landing system, which systems may refer to a ground-based instrument approach providing precision guidance to an aircraft approaching and/or landing on a runway or taking-off from a runway, may be categorized in three different categories (CAT I-III) according to the International Civil Aviation Organization (ICAO). These categories specify, amongst others, an alert height and a certain minimum visibility range for aircraft taking-off or landing on a runway.

Currently available systems are limited to operations in category CAT IIIb, wherein manual intervention of a pilot is still required. Moreover, ground equipment required for this category may be associated with rather high acquisition, installation, and maintenance costs. Therefore, ground stations of category CAT III are only available at large heavily congested commercial airports, which are at the present time neither suitable as main operating bases for routine operations of UAVs or RPAs nor as emergency landing sites for UAVs or RPAs.

Apart from that, required ground equipment usually comprises a fixed installation with high impact on airport infrastructure, thereby requiring extended periods of time for a respective survey, a system setup, and an acceptance testing procedure. Consequently, instrument landing systems and microwave landing systems may not be suitable options for military operations, which may require a rapid deployment to airfields with no pre-existing ground infrastructure.

Furthermore, equipment and gear applied as take-off and landing aid systems may have some shortcomings, in particular when taken alone. For instance regarding Global Navigation Satellite Systems (GNSS), such as e.g. the Global Positioning System (GPS) as well as the Russian and European pendants GLONASS and Galileo, accuracy, integrity, continuity, and availability may not be sufficient for some take-off and landing operations. This relates to both civil service GPS, such as e.g. C/A GPS, and military service GPS, such as e.g. P(Y) GPS. However, civil service GPS may further be subject to unintentional (jamming) and intentional (spoofing) GPS Signal-In-Space degradation and alteration by third parties, which may be considered a major drawback of these technologies.

Also, Ground Based Augmentation Systems such as e.g. the American Local Area Augmentation System (LAAS) may not be suitable and certifiable for CAT IIIc operations. Moreover, such systems lack a worldwide availability and robustness in terms of their signals provided. Also, ground equipment required for such technology may involve rather high acquisition, installation, and maintenance costs. Although appearing to be more suited for take-off and landing aid systems, nearly the same applies to Space Based Augmentation Systems, such as e.g. the American Wide Area Augmentation System (WAAS), and the European Geostationary Navigation Overlay Service (EGNOS).

Also unconventional take-off and landing aid systems such as Radar Tracker Systems or Laser Tracker Systems have certain drawbacks. For instance, such systems lackcertification to civil aviation standards as single navigation means and may not be suitable for all-weather operations, as it is the case with Laser Tracker Systems.

SUMMARY

There is a need to provide a comprehensive take-off and landing aid system and method for an aircraft, in particular for an Unmanned Air Vehicle and/or a Remotely Piloted Aircraft, which allows carrying out automatic take-off and landing procedures of the respective aircraft.

According to a first embodiment, an automatic take-off and landing control device for an aircraft is provided. The control device comprises at least two of: at least one local tracking device adapted for receiving at least one local signal from at least one local ground station and adapted for determining a position of the aircraft based on the local signal; at least one GNSS tracking device adapted for receiving a GNSS signal and adapted for determining a position of the aircraft based on the GNSS signal; at least one camera device adapted for observing an environment of the aircraft; and at least one monitoring device adapted for continuously and automatically supervising a performance and/or a health status of at least two of the at least one local tracking device, the at least one GNSS tracking device, and the at least one camera device based on analyzing signals received from at least two of the at least one local tracking device, the at least one GNSS tracking device, and the at least one camera device.

Therein the term "local tracking device" may refer, for example, to a radar-based tracking device, an instrument landing system (ILS) based tracking device, a microwave landing system (MLS) based tracking device, a tactical air navigation (TACAN) based tracking device, a VOR (very high frequency omni-directional radio range) with Distance Measuring Equipment (VDME) based tracking device, a laser link based tracking device or a pseudo-lite (pseudo satellite) system. A pseudo-lite system consists of multiple local distance measurements of the aircraft.

The term "GNSS tracking device" may refer to a satellite-based tracking device, wherein GNSS stands for "Global Navigation Satellite Systems", a satellite navigation system with global coverage providing autonomous geo-spatial positioning. Therefore, the GNSS tracking device may comprise a tracking device based on the Global Positioning System (GPS) as well as e.g. the Russian and European pendants GLONASS and Galileo and any other satellite-based positioning system.

Take-off operations/procedures and landing operations/procedures may, for example, involve additional movement of the aircraft on taxiways before take-off of an aircraft or after landing of an aircraft.

Optionally, the automatic take-off and landing control device may further comprise at least one altimeter adapted for determining an altitude of the aircraft above a ground level. The monitoring device may optionally be adapted for continuously and automatically supervising a performance and a health status of the at least one altimeter based on analyzing signals received from at least two of the at least one local tracking device, the at least one GNSS tracking device, the at least one altimeter, and the at least one camera device.

The term "supervising a performance and a health status" may refer to applying various means of supervision and/or analyses to the at least one local tracking device, the at least one GNSS tracking device, the at least one altimeter, and the at least one camera device. This may comprise, amongst others, checking and/or analyzing a current and/or a voltage level applied to the respective devices, checking an availability of a Radar signal from the Radar ground station, checking an availability of a GNSS signal from various satellites, and checking a number of available GNSS satellites. Apart from that, it may comprise checking and/or analyzing signal strength of the local signal from the local ground station, signal strengths of the GNSS signals from various satellites, and signal strength from the altimeter. Moreover, it may comprise determining quality of position data provided by the local tracking device and/or the GNSS tracking device, and quality of altitude data provided by the altimeter, which may include estimating an uncertainty of the respective position/altitude data and/or determining a data spread of data provided by devices of a same kind, e.g. data spread of signals provided by various local tracking devices. Concerning the at least one camera device, supervising the performance and health status may further comprise e.g. determining random noise, luminosity, and contrast of image data. As described above, supervising the performance and health status may comprise analyzing signals received from at least two of the devices, wherein the at least two devices may be of a same kind, such as e.g. analyzing signals received from at least two local tracking devices, or of different kinds, such as e.g. analyzing signals received from a local tracking device and a GNSS tracking device.

The term "continuously and automatically supervising performance and/or health status" may refer to continuous and automatic supervision and analysis of signals and/or data provided by the respective devices in certain time steps, such as e.g. each several nanoseconds, each microsecond or each millisecond. It may also refer to supervision and analysis of continuous data and/or signals if provided by a device. Moreover, this may also include analysis of time development of data and/or signals provided by the devices, thereby allowing determining for instance velocity of the aircraft.

The term "supervising based on signals from at least two" of the at least one local tracking device, the at least one GNSS tracking device, and the at least one camera device may refer to the monitoring device at least checking availability of signals of at least two position sensor devices, which may be of a same kind, such as e.g. signals from two local tracking devices, or of different kind, such as e.g. a signal from a local tracking device and a signal from a GNSS tracking device.

The described automatic take-off and landing control device may allow fully automatic take-off and landing operations/procedures of aircrafts, particularly of UAVs and/or RPAs, under instrument meteorological conditions, i.e. under conditions which may require a pilot to fly primarily by reference to instruments rather than by outside visual reference. Moreover, the control device may allow automatic take-off and landing even with no decision height and no runway visual range, similarly to category "CAT IIIc" maneuvers, which may currently not yet be operational anywhere in the world.

Apart from that, the disclosed control device may be certifiable to current European airworthiness standards for RPAs, such as e.g. standards contained in the NATO Standard Agreement STANAG 4671 "UAV Airworthiness Requirements for North Atlantic Treaty Organization Military UAV Systems".

Furthermore, the control device may be designed to fulfill All-Weather-Operations requirements of EASA document "Certification Specifications for All Weather Operations".

According to an embodiment, the monitoring device of the automatic take-off and landing control device is adapted for comparing the position of the aircraft determined based on the local signal with the position of the aircraft determined based on the GNSS signal, e.g. the GPS signal.

Therein, "comparing the position" may comprise for instance weighting of position data according to quality of the position data, thereby potentially reflecting an uncertainty of the position data, such as e.g. spread in position data provided by various devices. The weighting of position data may include parameters related to signal quality, such as e.g. signal strength of a local signal, e.g. a radar signal, from a local ground station, e.g. a radar ground station, and/or of GNSS signals, e.g. GPS signals, received from satellites, as well as parameters related to e.g. a number of available satellites.

Apart from that, comparison of position data may comprise coordinate transformation. For instance, position data provided in the World Geodetic System 1984 (WGS84), such as e.g. GPS-based position data, may be compared with position data provided in a metric coordinate system, such as e.g. a Cartesian cubical, polar or spherical coordinate system, and vice versa.

According to an embodiment, the monitoring device of the automatic take-off and landing control device is adapted for determining a lateral displacement of the aircraft with respect to a longitudinal extension of a runway from signals received from at least one of the at least one local tracking device, the at least one GNSS tracking device, and the at least one camera device.

The term "longitudinal extension" of the runway may refer to a line of the runway, such as e.g. a centerline, a borderline, or a boundary of the runway in a longitudinal direction of the runway, which line may extend from either frontal boundary of the runway. The longitudinal extension may thus be regarded as a virtual line extending infinitely along the longitudinal direction of the runway.

Accordingly, the term "lateral displacement" of the aircraft may refer to a distance of the aircraft with respect to the prescribed longitudinal extension, which extends from both frontal boundaries of the runway in longitudinal direction of the runway.

For this purpose, coordinates of the runway, for instance at least two coordinates, of a physical centerline and/or coordinates of borderlines or boundaries of the runway may be predefined. The predefined coordinates may, for example, be accessed by the monitoring device via an access to a database and/or a look-up table. The coordinates may also be remotely provided to the monitoring device, e.g. via a ground station near the runway or via a remote control signal.

The monitoring device may thus be adapted for determining the longitudinal extension of the runway, e.g. by calculating a vector in longitudinal direction of the runway based on the predefined coordinates. The monitoring device may further be adapted for determining the lateral displacement of the aircraft with respect to the longitudinal extension based on the position data provided by at least one of the at least one local tracking device, the at least one GNSS tracking device and/or based on a signal provided by the at least one camera device. The lateral displacement may e.g. be determined by calculating a distance between the aircraft and the longitudinal extension of the runway along a direction perpendicular to the longitudinal direction of the runway, i.e. along a transverse direction of the runway.

Apart from that, time development of the lateral displacement may be determined by the monitoring device e.g. during landing procedure, by estimating an expected trajectory of the aircraft based on the position data while approaching a runway. This may mean that the monitoring device may be adapted for extrapolating a current movement of the aircraft, thereby estimating an expected lateral displacement of the aircraft for a time in the future. This may, for example, advantageously allow determining an optimum landing direction and/or approach maneuver of the aircraft to the runway.

Therefore, the term "lateral displacement" may either refer to an actual lateral displacement of the aircraft with respect to the longitudinal extension, i.e. for instance lateral displacement in flight during an approach of the aircraft to an airfield, or it may refer to an expected and/or estimated lateral displacement for a time in the future, such as e.g. a time of a touchdown of the aircraft onto the airfield and/or the runway. Accordingly, the lateral displacement may refer to a touchdown point, i.e. a point on the airfield and/or the runway the aircraft may be expected to touchdown. The touchdown point may thus be estimated by the control device based on signals received from the local tracking device, the GNSS tracking device, the altimeter and/or the camera device, and the optimum landing direction and/or approach maneuver of the aircraft to the runway may be determined.

According to an embodiment, the monitoring device of the automatic take-off and landing control device is adapted for determining a threshold lateral displacement value of a lateral displacement of the aircraft with respect to a longitudinal extension of a runway. The threshold lateral displacement value may be specified a priori based on, amongst others, analysis of airfield geometry, analysis of potential hazard, and aircraft peculiarities. Accordingly the threshold lateral displacement value may be stored e.g. in a database and/or a look-up table, and the monitoring device may "determine" the threshold lateral displacement value by an access to the database and/or the look-up table. Therein, take-off or landing of the aircraft is carried out fully automatically based on the signal from the local tracking device if the local signal from the local ground station is available and if a lateral displacement of the aircraft with respect to the longitudinal extension of the runway determined based on the signal from the local tracking device and/or determined based on the signal from the GNSS tracking device is smaller than the threshold lateral displacement value, and wherein the take-off or landing of the aircraft is carried out based on a signal received from the camera device if the lateral displacement of the aircraft determined based on the signal from the local tracking device and/or the signal from GNSS tracking device exceed the threshold lateral displacement value.

The term "based on a signal received from the camera device" may for instance refer to take-off or landing procedure being carried out based on a video signal from the camera device, which may be carried out automatically by the monitoring device or manually by a pilot. Moreover, the term may refer to the monitoring device deciding which of the signals received from the local tracking device and the GNSS tracking device appears to provide proper and accurate position data. In other words, the camera device may serve to decide if take-off or landing procedure may be carried out based on a signal from the local tracking device or based on a signal from the GNSS tracking device.

The threshold lateral displacement value may for instance refer to a distance to a centerline and/or a lateral boundary of the runway in transverse direction of the runway. The threshold lateral displacement value may, for example, indicate a boundary between a load bearing region, which may comprise the runway itself and e.g. a transition strip extending laterally along the runway, and a region in a vicinity of the runway, which may not be load bearing. The term "longitudinal direction" of the runway may refer to a direction along a long side of a footprint of the runway, whereas the term "transverse direction" may refer to a direction orthogonal to the longitudinal direction, i.e. a direction along a short side of the footprint of the runway.

For instance, a so called "NATO group B" airfield, which may specify a certain layout of an airfield according to approved criteria and standards released by NATO, may be chosen as a design typology for the automatic take-off and landing control device, wherein the airfield may include a runway and adjacent areas. Such a runway may have a lateral extension of e.g. 45 m, i.e. it may be extending laterally 22.5 m on both sides of the centerline of the runway. The runway may be bordered laterally along the entire longitudinal extent of the runway on both sides by so called shoulders, which may extend e.g. 30 m laterally from the runway. Directly adjacent to the runway, the shoulders may comprise a load bearing and/or paved transition strip, which may extend e.g. 3 m laterally from the lateral borders of the runway. The load bearing transition strip may be designed such that an aircraft may land thereon, whereas the rest of the shoulders may not be adapted for bearing any load. Generally, an area extending laterally e.g. 150 m on both sides from the runway's centerline may define a so called safety zone, according the NATO group B standard. This safety zone may only contain essential flying aids, therefore excluding risks to personnel on ground. The safety zone may thus be supposed to contain no obstacles, such as e.g. buildings or the like. However an aircraft may only be landed on the runway itself and the load bearing transition strips adjacent laterally along the entire longitudinal extent of the runway on both sides of the runway. Accordingly, for a NATO group B runway the threshold lateral displacement value may refer to the lateral borders of the load bearing transition strip, which may have a distance of e.g. 25.5 m to the centerline of the runway on either side of the centerline, i.e. a distance corresponding to half the lateral extent of the runway, which may e.g. measure 22.5 m, and the transition strip, which may measure 3 m in width.

Therefore, the monitoring device may have access, e.g. via a database and/or a look-up table, to predefined parameters describing a layout of a specific runway, and the monitoring device may be adapted to determine the threshold lateral displacement value based on predefined coordinates of the runway and assuming a layout of the runway in compliance with the prescribed NATO group B standard. For instance, coordinates of the specific runway and a respective lateral extent of the runway, potentially including a load bearing transition strip, may be provided to the monitoring device, e.g. via a database, a look-up table or via remote control. Apart from that, also the threshold lateral displacement value itself may be determined by the monitoring device via accessing a database and/or a look-up table.

As described above, a take-off or landing of the aircraft may be carried out fully automatically or manually based on the signal from the local tracking device if the local signal, a radar signal, from the local ground station, a radar ground station, is available and if an actual lateral displacement as determined by the monitoring device based on signals from the local tracking device and/or the GNSS tracking device is smaller than the threshold lateral displacement value as determined by the monitoring device. Moreover, if an exceedance of the actual lateral displacement, as determined based on the local tracking device and/or the GNSS tracking device, with respect to the threshold lateral displacement value occurs, the take-off or landing of the aircraft may be carried out based on a signal received from the camera device, the camera device may in this case be used as landing aids solution. Alternatively, take-off or landing procedure based on the camera device may for instance comprise manual take-off or landing by a pilot. The pilot may either be situated in the aircraft using image data provided by the camera device or he may remotely control the aircraft also using image data provided by the camera device. Apart from that, the automatic take-off and landing device may also automatically control the aircraft. by applying appropriate image processing tools analyzing image data from the camera device and applying adequate decision-making logics. For this purpose, the monitoring device may, for example, comprise an image processing device and a decision-making logic device.

According to an embodiment, the monitoring device of the automatic take-off and landing control device is adapted for determining a threshold lateral displacement value of a lateral displacement of the aircraft with respect to a longitudinal extension of a runway, wherein a take-off or landing of the aircraft is carried out based on the signal from the GNSS tracking device if the local signal, e.g. a radar signal, from the local ground station, e.g. a radar ground station, is unavailable, and wherein the take-off or landing is monitored based on a signal received from the camera device, and wherein a landing trial of the aircraft is aborted if a lateral displacement of the aircraft with respect to the longitudinal extension of the runway determined based on the signal from the GNSS tracking device exceeds the threshold lateral displacement value.

In other words, if no local signal from the local ground station, e.g. a radar ground station, is available, a take-off and landing may be conducted based on position data and/or the signal from the GNSS tracking device if the actual lateral displacement of the aircraft as determined based on the signal from the GNSS tracking device is smaller than the threshold lateral displacement value. Apart from that, if no local signal, e.g. a radar signal, may be available, the take-off and landing procedure may be monitored and/or supervised based on the signal from the camera device, wherein such monitoring may be conducted manually by a pilot, either situated in the aircraft or via remote control, or automatically based on image processing tools analyzing image data from the camera device including adequate decision-making logics. Moreover, if an exceedance of the actual lateral displacement of the aircraft with respect to the threshold lateral displacement value occurs, a landing trial may be aborted.

The previously described take-off and landing approaches may be understood as follows: various position sensors, such as e.g. the local tracking device, the GNSS tracking device, and the camera device, may provide a position data to the monitoring device. The monitoring device may calculate the actual lateral displacement of the aircraft based on the measures by each of the different position sensors. The monitoring device may then compare these lateral displacements among one another in order to determine a health status of each sensor and in order to exclude sensors presenting undetected failures. Apart from that, the monitoring device may compare the lateral displacements with the threshold lateral displacement value in order to warn for and/or initiate a landing/takeoff abort procedure, in case the threshold lateral displacement value is trespassed.

As an example, a take-off or landing procedure may be conducted as follows: if a local signal, e.g. a radar signal, from a local ground station, e.g. a radar ground station, is available, the local tracking device may be reliable; it may have priority and may thus serve to conduct a take-off or landing of the aircraft. If a local signal, e.g. a radar signal, is available, but an actual lateral displacement of the aircraft exceeds the threshold lateral displacement, the camera device may be used as an assisting device for the take-off or landing in addition to a signal from the local tracking device. If no local signal is available from a local ground station, the take-off or landing may be conducted based on the signal from GNSS tracking device while the displacement of the aircraft is smaller than the threshold lateral displacement value. If the actual lateral displacement exceeds the threshold lateral displacement value, a landing trial may be aborted.

According to an embodiment, a further landing trial is carried out when the landing trial is aborted.

Optionally, a cleared area may be determined based on the signal received from the camera device and the aircraft may be landed in the cleared area. The cleared area may be located outside an airfield and the aircraft may be landed and/or crashed in that cleared area. The cleared area may further be predefined and e.g. provided to the monitoring device via an access to a database and/or a look-up table, or the cleared area may be determined automatically or manually by a pilot based on a video signal from the camera device.

This may mean a landing trial may be repeated as long as the actual lateral displacement of the aircraft as determined based on the signal from GNSS tracking device exceeds the threshold lateral displacement value. After a certain number of abortive landing trials or upon a control signal, which may be remotely provided to the aircraft, the signal received from the camera device may serve to find a cleared area, i.e. an area without obstacles, and the aircraft may be landed in that area.

According to an embodiment, the at least one camera device of the automatic take-off and landing control device is adapted for observing the environment of the aircraft in forward and/or downward direction of the aircraft, and, wherein the at least one camera device comprises an optical and/or an infrared camera. In other words, the camera device may be a forward-looking camera device observing the environment of the aircraft about a flight direction. Furthermore, by using an infrared camera, image data may be provided even in cloudy or foggy weather conditions and even during night-time, thus advantageously providing environment information under nearly all conditions.

According to an embodiment, the at least one GNSS tracking device comprises a military and/or a civil-certified e.g. GPS unit, including e.g. a respective GNSS receiver, e.g. a GPS receiver.

The GNSS tracking device may also be adapted to receive an augmented GNSS signal, for instance including differential corrections for a GNSS/GPS position. Such augmented GNSS system may comprise a Ground-Based Augmentation System (GBAS), in which differential corrections may be provided by a ground station, or a Space-Based Augmentation System (SBAS), in which differential corrections may be provided by a satellite. A GBAS GNSS signal may, for example, be provided by the American Local Area Augmentation System (LAAS). A SBAS GNSS signal may be provided e.g. by the American Wide Area Augmentation System (WAAS), by the European Geostationary Navigation Overlay Service (EGNOS) as well as any other provider such as e.g. Omnistar.

A military certified GNSS unit, such as e.g. a P(Y) GPS unit, may advantageously be applied as it may provide a robustness against unintentional or intentional GPS-signal-in-space degradation, sometimes referred to as "jamming", and intentional GPS-signal-in-space alteration by third parties, sometimes referred to as "spoofing".

Accordingly the automatic take-off and landing control device may be operable even under GNSS jamming and/or spoofing threat.

Apart from that, an application of a military and/or civil-certified SBAS GNSS unit may allow for emergency landing world-wide in contingency cases, even with no ground aids available. Furthermore, considerably less acquisition, installation and maintenance costs than currently available systems may be required for airborne and/or ground equipment. Additionally, considerably shorter times for deployment and installation may be required than required in currently available systems.

According to an embodiment, the automatic take-off and landing device further comprises at least one altimeter adapted for determining altitude of the aircraft above a ground level, wherein the altimeter is an altimeter selected from a group of Radar altimeter, barometric altimeter, and Laser altimeter.

Also various altimeters of different kind may be combined, which may increase reliability and precision of altitude detection or measurement. In particular a Radar altimeter may be advantageously applied as it may be applicable even under foggy and/or cloudy weather conditions.

A further aspect relates to an aircraft comprising the automatic take-off and landing control device as described in the above and in the following.

According to an embodiment, the aircraft is an Unmanned Air Vehicle (UAV) and/or a Remotely Piloted Aircraft (RPA). However, the invention may not be limited to UAVs and/or RPAs, but may rather also be advantageously applied in other aircraft, for instance as take-off and landing aids and/or support system.

Another aspect relates to a method for taking-off or landing an aircraft with at least two of at least one local tracking device, of at least one GNSS tracking device, and of at least one camera device, and further comprising at least one monitoring device. The method comprises the steps of: receiving at least one signal from at least two of the at least one local tracking device, the at least one GNSS tracking device, and the at least one camera device; analyzing the signals received from at least two of the at least one local tracking device, the at least one GNSS tracking device, and the at least one camera device; comparing at least two positions of the aircraft determined based on signals from at least two of the at least one local tracking device, the at least one GNSS tracking device, and the at least one camera device; determining a lateral displacement of the aircraft with respect to a longitudinal extension of a runway based on signals from at least one of the at least one local tracking device the at least one GNSS tracking device and the at least one camera device; determining a threshold lateral displacement value of the aircraft with respect to the longitudinal extension of the runway; comparing the lateral displacement of the aircraft with the threshold lateral displacement value; and taking-off or landing the aircraft. Therein, taking-off or landing the aircraft is carried out fully automatically based on the signal received from the local tracking device if e.g. a local signal, e.g. a radar signal, from a local ground station, e.g. a radar ground station, is available and if the lateral displacement determined based on the signal from the local tracking device and/or the GNSS tracking device is smaller than the threshold lateral displacement value.

The aircraft may further comprise at least one altimeter, which may optionally provide information about an altitude of the aircraft above ground.

According to an embodiment, taking-off or landing of the aircraft is carried out based on the signal received from the camera device if the local signal, e.g. a radar signal, from the local ground station, e.g. a radar ground station, is available and if the lateral displacement determined based on the signals from the local tracking device and/or the GNSS tracking device exceed the threshold lateral displacement value.

According to an embodiment, the method for taking-off or landing an aircraft further comprises monitoring a take-off or landing of the aircraft based on the signal received from the camera device if the local signal from the local ground station is unavailable, wherein taking-off or landing of the aircraft is carried out based on the signal from the GNSS tracking device if the local signal from the local ground station is unavailable.

According to an embodiment, the method for taking-off or landing an aircraft further comprises aborting a landing trial of the aircraft if the lateral displacement of the aircraft determined based on the signal from the GNSS tracking device exceeds the threshold lateral displacement value; and carrying out a further landing trial. Optionally, a cleared area may be determined based on the signal from the camera device and the aircraft may be landed in the cleared area.

It has to be understood that features of the method for automatic take-off and landing as described in the above and in the following may be features of the automatic take-off and landing control device as described in the above and in the following.

If technically possible but not explicitly mentioned, also combinations of embodiments described in the above and in the following may be embodiments of the method and the control device.

These and other aspects of the embodiments will be apparent from and elucidated with reference to the embodiments described hereinafter.

BRIEF DESCRIPTION OF THE DRAWINGS

The various embodiments will hereinafter be described in conjunction with the following drawing figures, wherein like numerals denote like elements, and.

The reference signs used in the drawings, and their meanings, are listed in summary form in the list of reference signs. The representations in the drawings are schematically and not to scale. In principle, similar or identical elements are provided with the same reference symbols in the figures.

DETAILED DESCRIPTION

Figure 1:
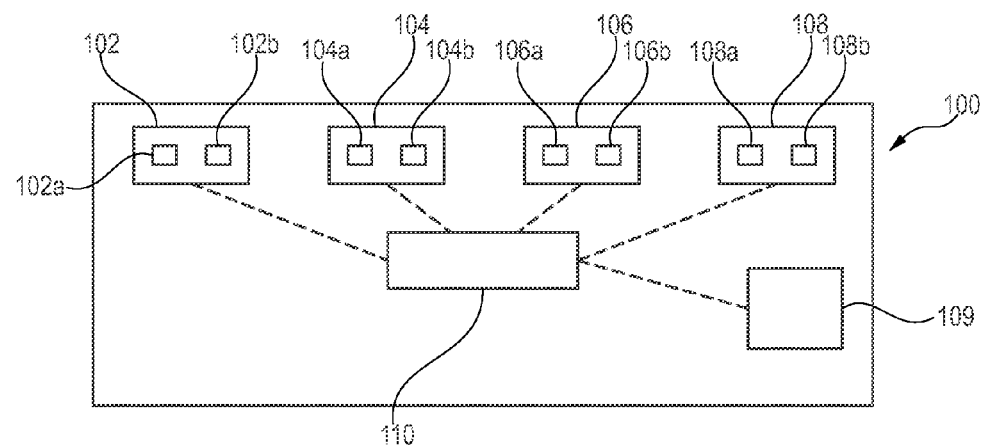
FIG. 1 schematically shows an automatic take-off and landing control device for an aircraft according to an embodiment.

The following detailed description is merely exemplary in nature and is not intended to limit the disclosed embodiments or the application and uses thereof. Furthermore, there is no intention to be bound by any theory presented in the preceding background FIG. 1 schematically shows an automatic take-off and landing control device 100 according to an embodiment.

The control device 100 comprises a local tracking device 102 adapted for receiving a local signal, e.g. a radar signal, from a local ground station, e.g. a radar ground station, and for determining a position of the aircraft.

The local tracking device 102 comprises a transponder module 102a and a transponder antenna 102b. The transponder antenna 102b may further comprise a directional antenna element, i.e. an antenna element with a narrow beam pattern, and an omnidirectional antenna element, i.e. an antenna element having a 360° beam pattern.

The control device 100 further comprises a GNSS tracking device 104, e.g. a GPS tracking device, adapted for receiving a GNSS signal, e.g. a GPS signal, and for determining a position of the aircraft. Apart from position data, the GNSS tracking device 104 may provide information about a velocity of the aircraft and/or information about an altitude of the aircraft above ground.

The GNSS tracking device 104 comprises a military GNSS unit 104a, such as e.g. a P(Y) GPS unit, and a civil-certified GNSS unit 104b, such as e.g. a C/A GPS unit. The military GPS unit 104a is adapted for providing a high three-dimensional accuracy while providing a high-level robustness and resistance against jamming and/or spoofing. The military GPS unit 104a may further allow operations worldwide, for instance on NATO group B airfields and/or any airport/airfield of comparable size. On the other hand, the civil-certified GPS unit 104b may ensure a three-dimensional accuracy worldwide, which may be required for flight operations. Apart from that, the civil-certified GPS unit 104b may satisfy civil aviation requirements on minimum navigation equipment and integration into non-segregated airspace.

The GNSS tracking device 104 with GPS units 104a and 104b may also be adapted to receive an augmented GNSS/GPS signal, for instance including differential corrections for a GNSS/GPS position. Such augmented GNSS system may comprise a Ground-Based Augmentation System (GBAS), in which differential corrections may be provided by a ground station, or a Space-Based Augmentation System (SBAS), in which differential corrections may be provided by a satellite. A GBAS GNSS signal may, for example, be provided by the American Local Area Augmentation System (LAAS). A SBAS GNSS signal may be provided e.g. by the American Wide Area Augmentation System (WAAS), by the Wide Area GPS Enhancement system (WAGE), by the European Geostationary Navigation Overlay Service (EGNOS) as well as any other provider such as e.g. Omnistar. The GNSS tracking device 104 with GPS units 104a and 104b may, accordingly, be adapted for receiving any augmented GNSS/GPS signal.

The control device 100 further comprises an altimeter 106 adapted for determining an altitude of the aircraft above a ground level. The altimeter 106 comprises a Radar altimeter unit 106a adapted for height-over-ground measurements, which may be used during an approach of the aircraft to a runway and which may be adapted to initiate a flare, a de-crab and/or a de-roll maneuver of the aircraft. The altimeter 106 further comprises a Radar altimeter antenna pair 106b, which may be connected to the Radar altimeter unit 106a and which may be adapted for emitting a Radar signal and/or for receiving a Radar signal reflected by a ground surface.

The control device 100 further comprises a camera device 108 adapted for observing an environment of the aircraft. The camera device 108 comprises a forward-looking camera 108a, which may be an electro-optical camera. The camera device 108 further comprises an optional forward-looking infrared camera 108b, which may be adapted for operations in low visibility conditions and during night time. The camera device 108 may be adapted for providing visual clues of an airfield and/or a runway e.g. to a remote pilot of the aircraft. The camera device 108 may further be adapted for monitoring a take-off and/or landing procedure, and it may further assist in arbitration of conflicting information in failure cases provided by the other devices, such as e.g. the local tracking device 102, the GNSS tracking device 104.

The control device 100 further comprises an inertial navigation device 109, which may be adapted for providing inertial attitudes and angular rates, thereby providing information about an acceleration of the aircraft in nearly any direction. This may include True and Magnetic Heading. Also velocity information may be provided by the inertial navigation system 109. Moreover, even position information may be provided by the inertial navigation device 109, which information may be used for guidance in all flight phases.

The control device 100 further comprises a monitoring device 110 adapted for continuously and automatically supervising a performance and a health status of the local tracking device 102, the GNSS tracking device 104, the altimeter 106 and the camera device 108 based on analyzing signals received from at least two of the local tracking device 102, the GNSS tracking device 104, the altimeter 106, and the camera device 108. Also the inertial navigation device 109 may be supervised and its signals may be analyzed by the monitoring device 110.

For this purpose, the monitoring device 110 is connected to the respective devices 102, 104, 106, 108, 109, and the monitoring device 110 may exchange, i.e. receive and/or provide, signals and/or data to and/or from the respective devices 102, 104, 106, 108, 109. The signals and/or data may be exchanged e.g. wirelessly and/or by respective electrical connections.

Particularly, the monitoring device 110 is adapted for comparing the position data of the aircraft determined by the local tracking device 102 based on a local signal, e.g. a radar signal, from a local ground station, e.g. a radar ground station, with the position data determined by the GNSS tracking device 104 based on a GNSS signal, e.g. a GPS signal.

Based on position data provided by the local tracking device 102 and the GNSS tracking device 104, the monitoring device 110 may further be adapted for determining a lateral displacement of the aircraft with respect to a centerline of a runway during a take-off or landing procedure. Additionally, a threshold lateral displacement value may be determined by, respectively may have been stored inside the monitoring device 110, as described in more detail in the above and in the following.

Figure 2:
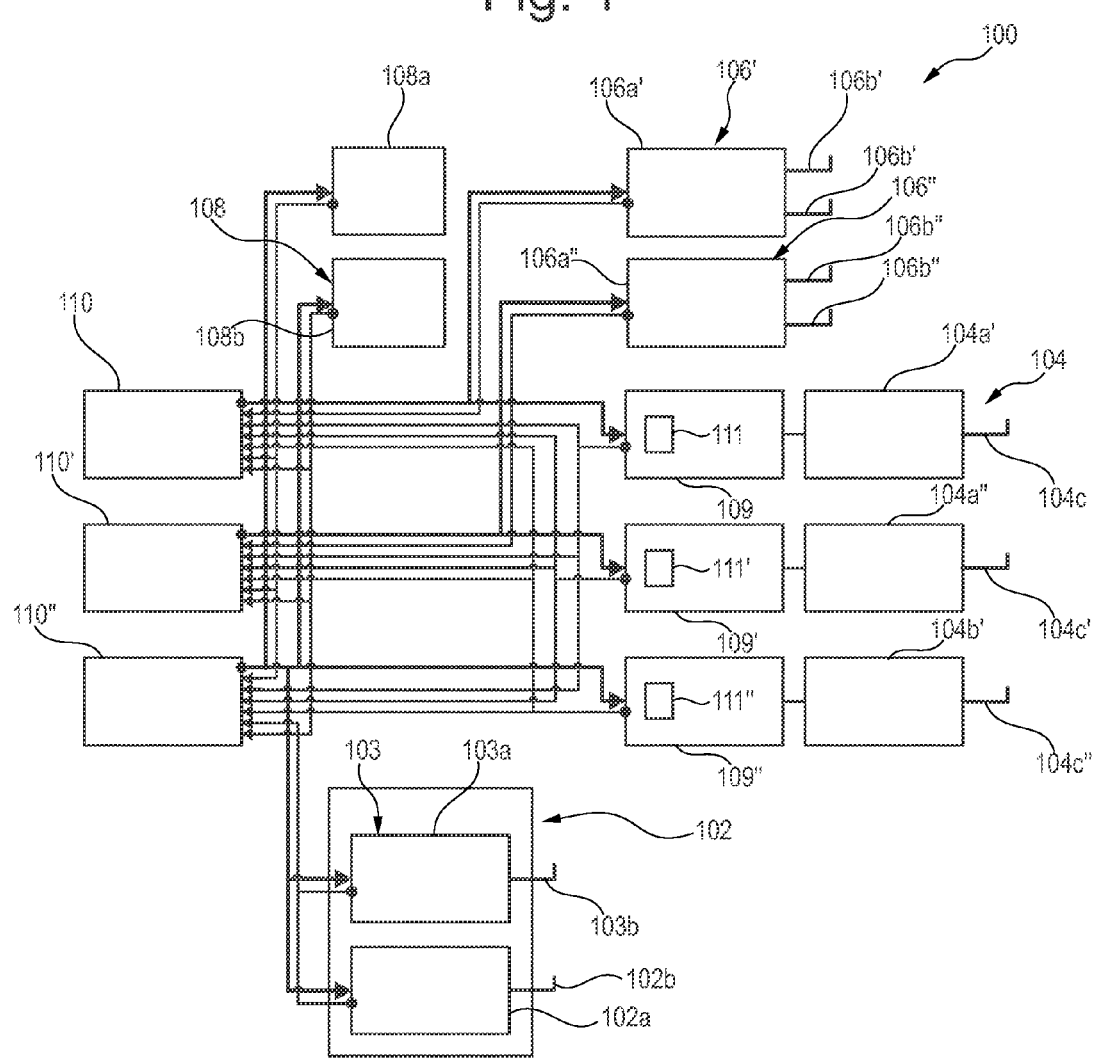
FIG. 2 schematically shows an automatic take-off and landing control device for an aircraft according to another embodiment.

FIG. 2 schematically shows an automatic take-off and landing control device 100 for an aircraft according to another embodiment. If not stated otherwise, the control device 100 of FIG. 2 comprises the same elements and features as the control device 100 of FIG. 1.

The control device 100 comprises a first Radar altimeter 106' and a second Radar altimeter 106", each of which comprise a Radar altimeter unit 106a', 106a" connected to a Radar antenna pair 106b', 106b", respectively.

The control device 100 further comprises a first, a second and a third inertial navigation device 109, 109', 109". Each inertial navigation device 109, 109', 109" comprises a Kalman filter module 111, 111', 111", respectively. The Kalman filter modules 111, 111', 111" may be Kalman filter bank modules.

The control device 100 further comprises a GNSS tracking device 104, which comprises a first military P(Y) GPS unit 104a' with a P(Y) GPS antenna 104c, a second military P(Y) GPS unit 104a" with a P(Y) GPS antenna 104c' and a civil-certified C/A GPS unit 104b' with a GPS antenna 104c". Also the antenna 104c" may be a P(Y) GPS antenna.

The prescribed Kalman filter modules 111, 111', 111" may be embedded in the respective inertial navigation devices 109, 109', 109" utilizing pure-inertial measurements from the inertial navigation devices 109, 109', 109" and utilizing pure-GPS measurements from the GPS units 104a', 104a", 104b'. By utilizing said measurements, the Kalman filter modules 111, 111', 111" may produce best estimates of a hybrid 3D-position of the aircraft, which may be used for horizontal guidance in all flight phases, and best estimates of hybrid velocities.

The control device 100 further comprises a camera device 108, which comprises an electro-optical forward-looking camera 108a and a forward-looking infrared camera 108b.

Apart from that, the control device 100 further comprises a local tracking device 102, which may provide a beacon/transponder point source radio-frequency signal from the aircraft. The radio-frequency signal may be acquired and tracked by a Radar tracker ground segment Ku-Band module to accurately determine the aircraft's position relative to a touchdown point. The local tracking device comprises a Radar transponder module 102a, which may contain all the electronics of the local tracking device 102 beacon/transponder functions. The local tracking device 102 further comprises a Radar transponder antenna 102b, which may comprise radio-frequency cabling hardware and which may provide the beacon/transponder point source radio-frequency signal from the aircraft. As already described in FIG. 1, a combined directional antenna with narrow beam pattern and high gain, which may be used when the aircraft is far from a local ground station, e.g. a radar ground station, and an omnidirectional antenna may be used. The omnidirectional antenna may have a 360° beam pattern and low gain, and it may be used when the aircraft is close to the Radar ground station, where aspect angles of the local tracking device 102 to the Radar ground station may vary greatly and a broad beam width may allow for continuous coverage.

The local tracking device 102 further comprises a Radar tracking ultra-high frequency (UHF) device 103, which comprises a Radar tracking UHF module 103a and a Radar tracking UHF antenna 103b. The Radar tracking UHF device 103 may receive data and/or signals up-linked by the Radar ground station to the aircraft. The Radar tracking UHF device 103 may further route such signals/data to the further elements/devices of the control device 100 such as the monitoring device 110.

The control device 100 further comprises a first monitoring device 110, a second monitoring device 110' and a third monitoring device 110" all of which are interconnected with the prescribed devices.

Figure 3:
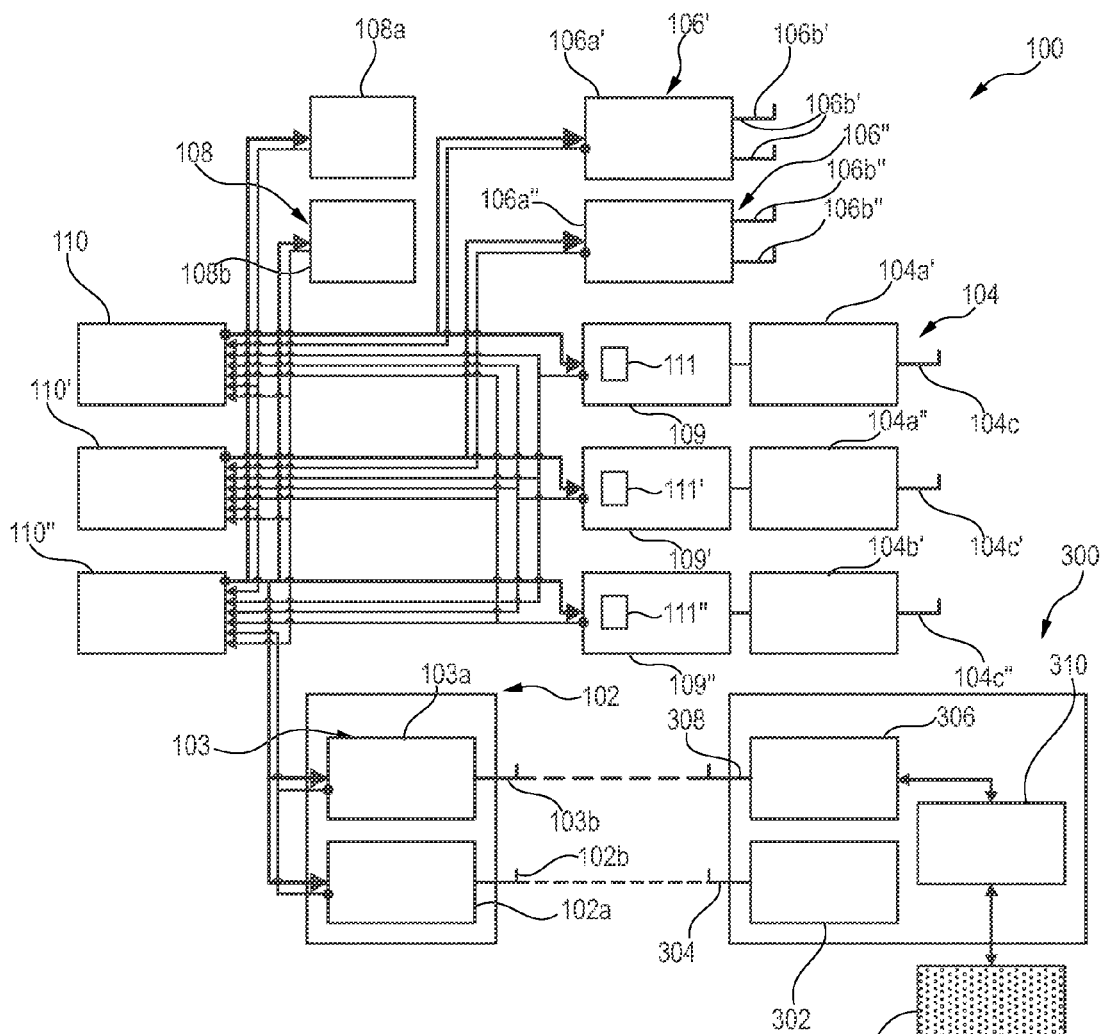
FIG. 3 schematically shows the automatic take-off and landing control device of FIG. 2 in combination with a Radar ground station.

FIG. 3 schematically shows the automatic take-off and landing control device 100 of FIG. 2 in combination with a Radar ground station 300. If not stated otherwise, the control device 100 of FIG. 3 comprises the same features and elements as the control devices 100 of FIGS. 1 and 2.

The Radar ground station 300 may track an aircraft beacon to accurately determine a position of the aircraft relative to a touchdown point on a runway.

The Radar ground station 300 comprises a Radar tracking ground module 302 with a Radar tracking ground radio-frequency (RF) antenna 304. The Radar tracking ground module 302 may provide power and control for line replaceable units of the Radar tracking ground station 300. The module 302 may also translate a position measured by the Radar tracking ground RF antenna 304 to the touchdown point using a pre-calibrated offset.

The Radar tracking ground RF antenna 304 may comprise a mobile or fixed antenna. It may track in real time a point source RF signal from the aircraft, which may be produced by the Radar transponder module 102a. There may also be a plurality of mobile and/or fixed antennas 304, which may measure 3D-position parameters of the aircraft combining measurements based on RF reflections of the aircraft's airframe and measurements based on interrogations of the Radar transponder module 102a.

Accordingly, an RF signal of the Radar tracking ground module 302 may be transmitted wirelessly via the Radar tracking ground RF antenna 304 to the Radar transponder antenna 102b of the aircraft's local tracking device 102. Vice versa, signals may be transmitted from the local tracking device 102 to the Radar tracking ground module 302 via the respective antennas.

The Radar ground station 300 further comprises a Radar tracking ground UHF module 306 with a Radar tracking ground UHF antenna 308. The module 306 may up-link tracking data of the aircraft as measured by the Radar ground station 300, together with status information of the Radar ground station 300 and commands from a Radar tracking ground control station 312.

Accordingly, an UHF signal of the Radar tracking ground UHF module 306 may be transmitted wirelessly via the Radar tracking ground UHF antenna 308 to the Radar UHF antenna 103b of the aircraft's local tracking device 102. Vice versa, signals may be transmitted from the local tracking device 102 to the Radar tracking ground UHF module 306 via the respective antennas.

The Radar ground station 300 further comprises Radar tracking ground link module 310, which may comprise a Radar tracking UHF link, which may comprise a UHF transceiver and a dedicated UHF antenna, and/or a Radar tracking physical link, which may comprise a transceiver and a physical connection, such as e.g. a cable to the Radar tracking ground control station 312. The Radar tracking ground link module 310 may provide means for controlling the aircraft's local tracking device 102, e.g. a radar tracking device, and/or the Radar tracking ground station 300 remotely from the Radar tracking ground control station 312.

Figure 4:
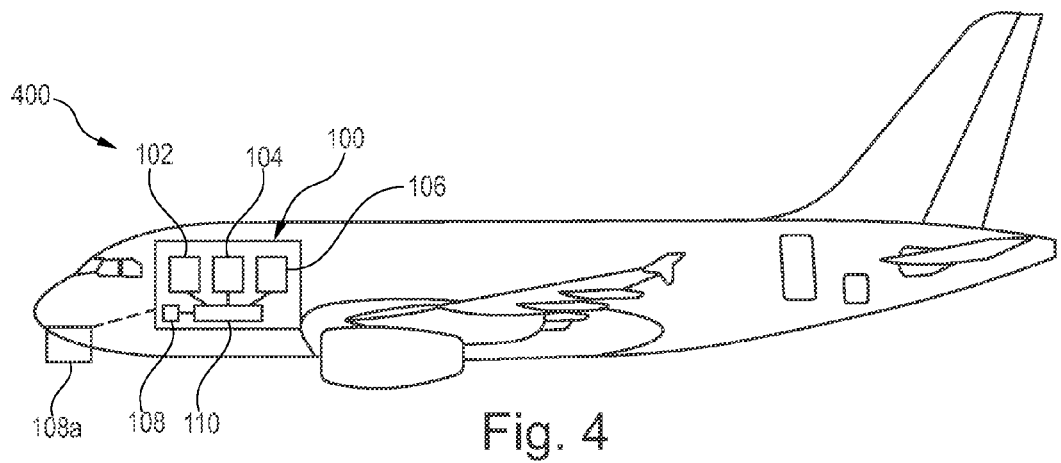
FIG. 4 schematically shows an aircraft according to an embodiment.

FIG. 4 schematically shows an aircraft 400 according to an embodiment. The aircraft 400 may, for example, be an Unmanned Air Vehicle (UAV) or a Remotely Piloted Aircraft (RPA).

The aircraft 400 comprises an automatic take-off and landing control device 100 with a local tracking device 102, a GNSS tracking device 104, an altimeter 106, a camera device 108 with a forward-looking camera 108a, and a monitoring device 110.

Figure 5A:
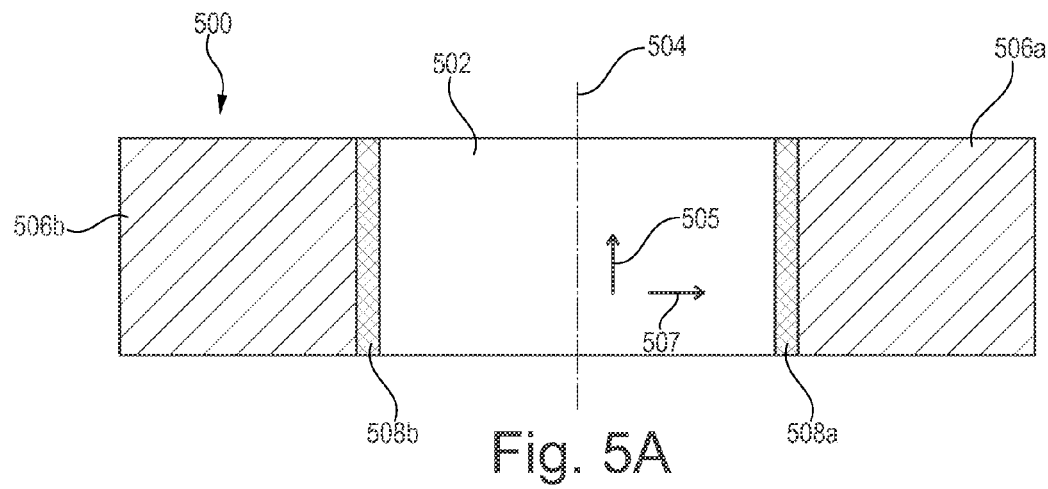
FIG. 5A schematically shows a layout of an airfield.

FIG. 5A schematically shows a layout of an airfield 500. The airfield 500 comprises a runway 502 with a centerline 504. The centerline 504 extends along longitudinal direction 505 of the runway 502.

The runway 502 may measure a width of 45 m in transverse direction 507 of the runway 502, wherein the transverse direction 507 may be orthogonal to the longitudinal direction 505. Accordingly, the runway 502 extends 22.5 m laterally on either side of the centerline 504.

Adjacent to the runway 502, so-called shoulders 506a, 506b are arranged, which may have a width of 30 m. In other words, the runway 502 is bordered by shoulders 506a, 506b, which may extend 30 m laterally from either side of the runway 502.

Directly adjacent to the runway 502, the shoulders 506a, 506b may further each comprise a load bearing and/or paved transition strip 508a, 508b, which may extend 3 m laterally from the runway 502. The load bearing transition strips 508a, 508b may be designed such that an aircraft 400 may land thereon, whereas the rest of the shoulders 506a, 506b may not be adapted for bearing any load.

The airfield shown in FIG. 5A may be a so called "NATO group B" airfield 500 and/or runway 502.

Figure 5B:
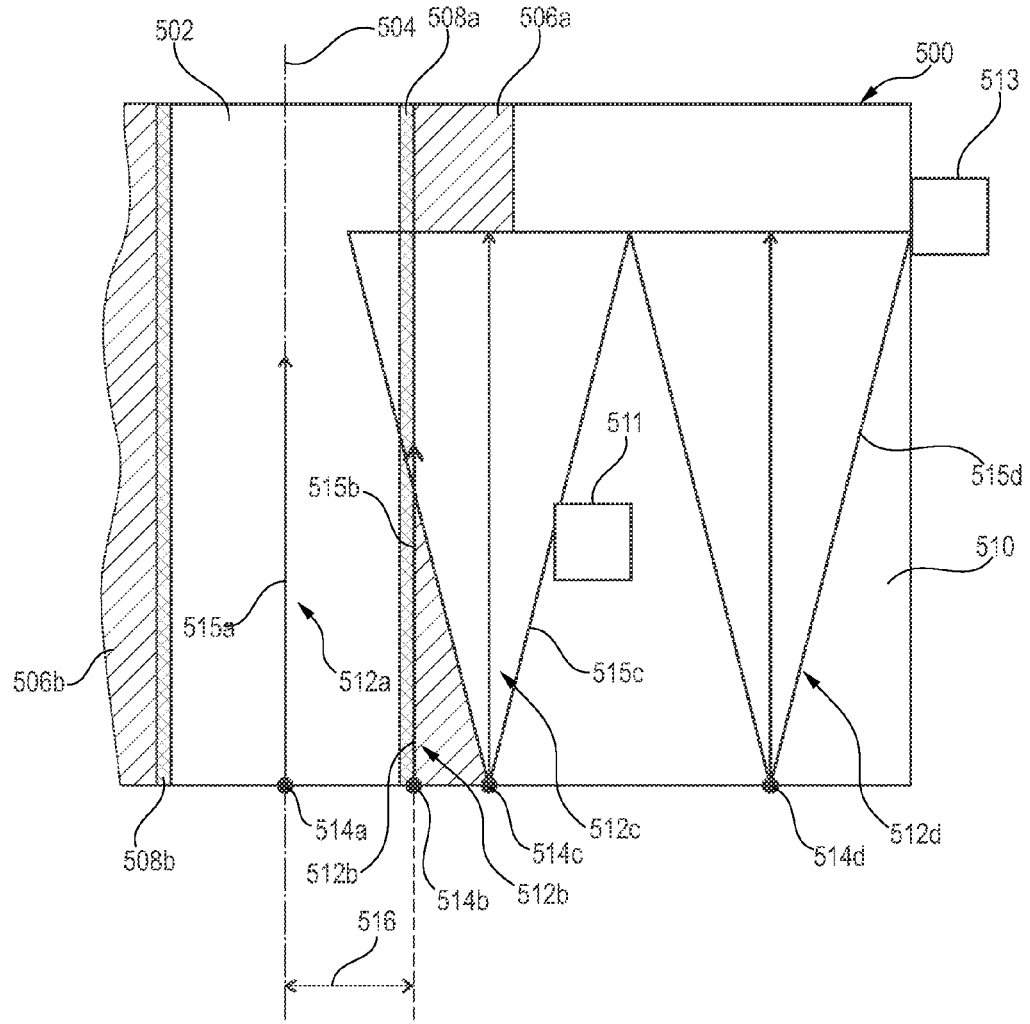
FIG. 5B schematically shows a layout of an airfield and possible landing trajectories with different lateral touchdown position displacements with respect to the extended runway centerline for an aircraft applying the automatic take-off and landing device according to an embodiment.

FIG. 5B schematically shows a layout of an airfield 500 and possible landing trajectories with different lateral touchdown position displacements with respect to the extended runway centerline for an aircraft 400 applying the automatic take-off and landing device 100 according to an embodiment. If not stated otherwise, the airfield 500 of FIG. 5B comprises the same elements as the airfield 500 of FIG. 5A.

Apart of the runway 502 with the centerline 504, the transition strips 508a, 508b and the shoulders 506a, 506b, the airfield 500 further comprises an unpaved area 510 adjacent to the shoulders 506a, 506b. The area 510 may extend 97.5 m laterally from the shoulders 506a, 506b on either side of the runway 502. The area 510 may comprise essential flying aids 511, such as e.g. the Radar ground station 300, whereas neither personnel may be present in the area 510 nor any other obstacles, such as e.g. buildings.

The airfield 500 may comprise a so-called safety zone laterally extending 150 m on either side of the centerline 504. The safety zone, thus, comprises the runway 502 and the shoulders 506a, 506b. Outside the safety zone, obstacles 513, such as e.g. buildings, may be present.

In FIG. 5B possible landing trajectories 512a, 512b, 512c, 512d with different lateral touch-down position displacements with respect to the extended runway centerline for landing trials of an aircraft 400 applying the automatic take-off and landing control device 100 are shown.

A first landing trial 512a with a first touchdown point 514a is shown along the centerline 504 of the runway 502, wherein the first touchdown point 514a is located on the centerline 504 of the runway 502. A potential landing behavior of an aircraft 400 for the first touchdown point 514a is indicated by the arrow 515a.

A second landing trial 512b with a second touchdown point 514b is shown along the transition strip 508a, wherein the second touchdown point 514b is located on the transition strip 508a. A potential landing behavior of the aircraft 400 for the second touchdown point 514b is indicated by the arrow 515b.

A third landing trial 512c with a third touchdown point 514c is shown along the shoulder 506a, wherein the third touchdown point 514c is located on the shoulder 506a. As the shoulder 506a is unpaved and not load bearing a possible landing of the aircraft 400 thereon may comprise an undefined behavior of the aircraft 400 during a landing procedure, i.e. no exact stopping point of the aircraft 400 may be determined This is indicated by the cone-shaped area 515c in FIG. 5B reflecting the possible landing behavior.

A fourth landing trial 512d with a fourth touchdown point 514d is shown along the area 510, wherein the fourth touchdown point 514d is located in the area 510. As the area 510 is unpaved and not load bearing a possible landing of the aircraft 400 thereon may also comprise an undefined behavior of the aircraft 400 during a landing procedure. This is indicated by the cone-shaped area 515d reflecting the possible landing behavior.

When approaching the runway 502, the automatic take-off and landing control device 100 determines a threshold lateral displacement value 516 of a lateral displacement of the expected touchdown point of the aircraft 400 on the airfield 500. The threshold lateral displacement value may be the distance between the centerline 504 and a boundary between the transition strip 508a, 508b and the rest of the shoulders 506a, 506b. Accordingly for the prescribed layout of the airfield 500, the threshold lateral displacement value 516 measures 25.5 m on either side of the centerline 504.

If a Radar signal from a Radar ground station 300 is available and if the lateral displacement of the aircraft 400 at the expected touchdown point as determined based on signals from the local tracking device 102 and/or the GNSS tracking device 104 is smaller than or equal to the threshold lateral displacement value 516, a take-off or landing of the aircraft 400 is carried out fully automatically based on the signal from the local tracking device 102. This relates to the landing trials 512a, 512b in FIG. 5B.

If the local signal, e.g. a radar signal, from a Radar ground station 300, or in general a local ground station, is available and if the lateral displacement of the aircraft 400 at the expected touchdown point as determined based on the signal from the local tracking device 102 and/or the signal from GNSS tracking device 104 exceed the threshold lateral displacement value 516, the landing maneuver of the aircraft 400 is aborted manually or automatically and a further landing trial may be carried out based on a signal received from the camera device 108. This relates to the landing trials 512c, 512d in FIG. 5B. The camera may be used as positioning source in cases where the local tracking device and the GNSS tracking device are not available. Otherwise, the camera may be used to supervise the landing maneuver and to solve ambiguous cases, whereby position information of the local tracking device 102 and position information of the GNSS tracking device 104 may be contradictory.

If no local signal, e.g. a radar signal, from the Radar ground station 300 is available and if the lateral displacement of the aircraft 400 at the expected touchdown point as determined based on the signal from the GNSS tracking device 104 is smaller than the threshold lateral displacement value 516, a take-off or landing of the aircraft 400 is carried out based on the signal from the GNSS tracking device 104. Additionally, the take-off and landing is monitored based on the signal received from the camera device 108. This relates to the landing trials 512a, 512b in FIG. 5B.

If no local signal, e.g. a radar signal, from a Radar ground station 300 is available and if the lateral displacement of the aircraft 400 at the expected touchdown point as determined based on the signal from the GNSS tracking device exceeds the threshold lateral displacement value 516, the take-off or landing of the aircraft 400 is aborted and a further landing trial may be carried out. This relates to the landing trials 512c, 512d in FIG. 5B. Optionally, a cleared area outside the airfield may be determined based on the signal from the camera device 108 and the aircraft 400 may be landed on the cleared area.

Figure 6:
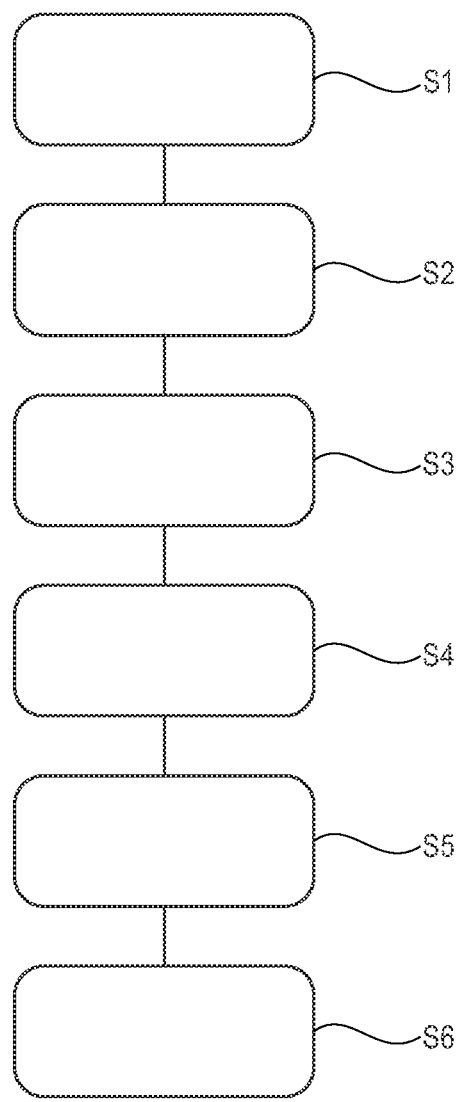
FIG. 6 shows a flowchart illustrating a method for taking-off or landing an aircraft according to an embodiment.

FIG. 6 shows a flowchart illustrating a method for taking-off or landing an aircraft 400 according to an embodiment. The aircraft 400 comprises an automatic take-off and landing control device 100 with at least one local tracking device 102, at least one GNSS tracking device 104, at least one altimeter 106, at least one camera device 108, and at least one monitoring device 110.

In a first step S1 of the method for taking-off or landing the aircraft 400 signals from the at least one local tracking device 102, the at least one GNSS tracking device 104, the at least one altimeter 106, and the at least one camera device 108 are received by the monitoring device 110.

Subsequently, the signals received from at least two of the at least one local tracking device 102, the at least one GNSS tracking device 104, the at least one altimeter 106 and the at least one camera device 108 are analyzed by the monitoring device 110 in a step S2. Step S2 may further comprise comparing the signals received from the local tracking device 102 and the GNSS tracking device 104 and the at least one camera device 108 and/or comparing a position of the aircraft 400 as determined based on said signals.

In a further step S3, a lateral displacement of the aircraft 400 with respect to a longitudinal extension of a runway 502 is determined by the monitoring device 110 based on signals from the local tracking device 102 and/or the GNSS tracking device 104 and/or the camera device 108.

In a step S4 a threshold lateral displacement value 516 of the aircraft 400 with respect to the longitudinal extension of the runway 502 is determined by the monitoring device 110.

The lateral displacement of the aircraft 400 as determined in step S3 is then compared by the monitoring device 110 in a step S5 with the threshold lateral displacement value 516 as determined in step S4.

Finally, taking-off or landing the aircraft 400 is carried out in a step S6, wherein taking-off or landing the aircraft 400 is carried out fully automatically based on the signal received from the local tracking device 102 if a Radar signal from a Radar ground station is available and healthy and if the lateral displacement determined based on the signal from the local tracking device 102 and/or the GNSS tracking device 104 and/or the camera device 108 is smaller than the threshold lateral displacement value 516.

If the lateral displacement determined based on signals from the local tracking device 102 and/or the GNSS tracking device 104 and/or the camera device 108 exceeds the threshold lateral displacement value 516, taking-off or landing of the aircraft 400 is aborted, and a new attempt may be initiated manually or automatically.

Figure 7:
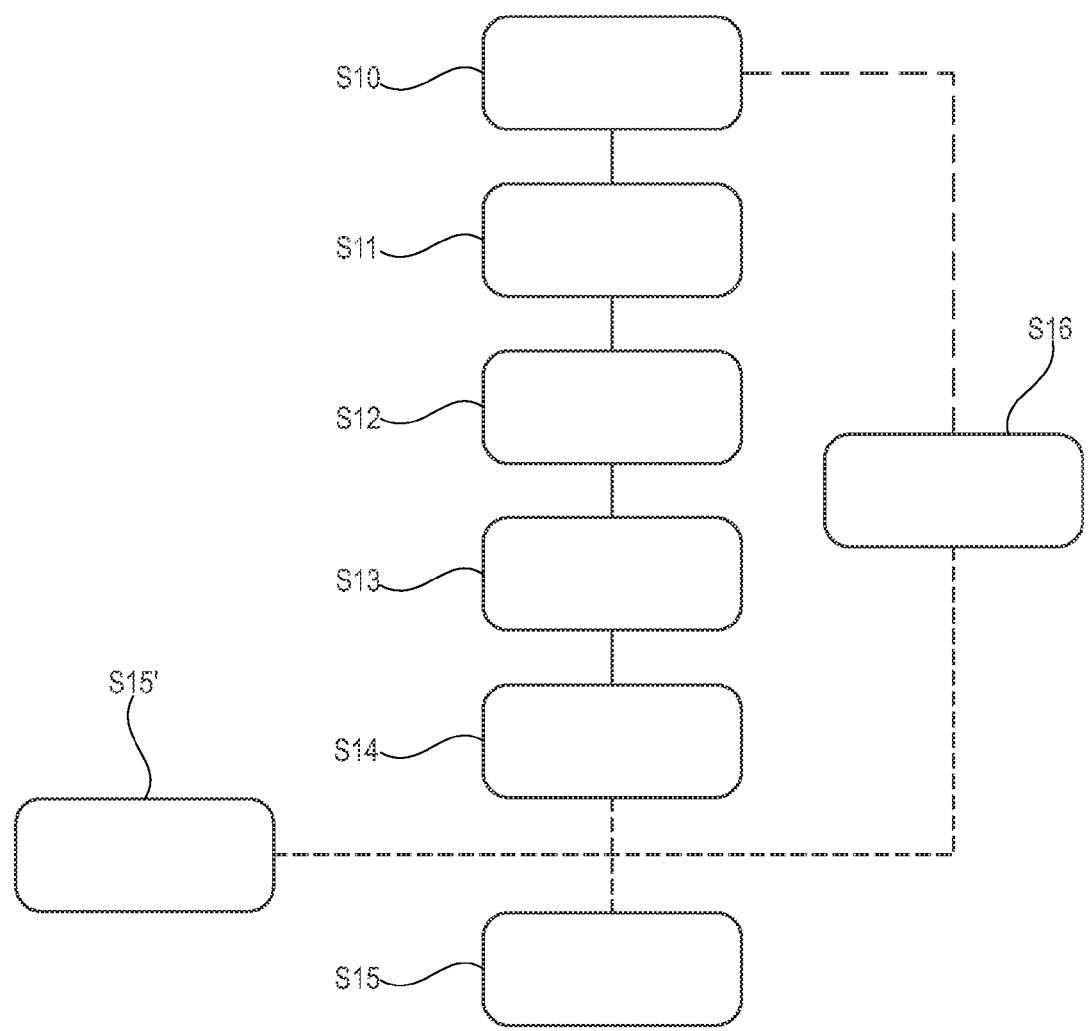
FIG. 7 shows a flowchart illustrating a method for taking-off or landing an aircraft according to another embodiment.

FIG. 7 shows a flowchart illustrating a method for taking-off or landing an aircraft 400 according to an embodiment. The aircraft 400 comprises an automatic take-off and landing control device 100 with at least two of the at least one local tracking device 102, the at least one GNSS tracking device 104, and the at least one camera device 108, and further comprising at least one altimeter 106 and at least one monitoring device 110.

In a first step S10 of the method for taking-off or landing the aircraft 400 signals from the at least one local tracking device 102, the at least one GNSS tracking device 104, the at least one altimeter 106, and the at least one camera device 108 are received by the monitoring device 110.

Subsequently, the signals received from at least two of the at least one local tracking device 102, the at least one GNSS tracking device 104, the at least one altimeter 106 and the at least one camera device 108 are analyzed by the monitoring device 110 in a step S11. Subsequently, at least two positions of the aircraft determined based on signals from at least two of the at least one local tracking device 102, the at least one GNSS tracking device 104 and the at least one camera device 108 are compared.

Step S11 may further comprise determining whether a Radar signal from a Radar ground station 300, a GNSS signal, e.g. a GPS signal, from the at least one GNSS tracking device 104, a height-above-ground signal from the at least one altimeter 106, and a video signal from the at least one camera device 108 are healthy.

In a further step S12, a lateral displacement of the aircraft 400 with respect to a longitudinal extension of a runway 502 is determined by the monitoring device 110 based on the signal from the local tracking device 102 and/or the GNSS tracking device 104 and/or the camera device 108.

In a step S13 a threshold lateral displacement value 516 of the aircraft 400 with respect to the longitudinal extension of the runway 502 is determined by the monitoring device 110.

The lateral displacement of the aircraft 400 as determined in step S12 is then compared by the monitoring device 110 in a step S14 with the threshold lateral displacement value 516 as determined in step S13.

Finally, taking-off or landing the aircraft 400 is carried out in a step S15 based on the signal from the GNSS tracking device 104 if a GNSS signal, e.g. a GPS signal from a GPS tracking device, is available and healthy and if the lateral displacement determined based on the signal from the GNSS tracking device 104 is smaller than the threshold lateral displacement value 516. Additionally, taking-off or landing the aircraft 400 is monitored based on a signal received from the camera device 108, wherein the monitoring may be carried out by a pilot of the aircraft 400, such as e.g. a remote pilot, and/or automatically by the monitoring device 110.

Alternatively, if lateral displacement determined based on the signal from the GNSS tracking device 104 exceeds the threshold lateral displacement value 516, a current landing trial of the aircraft 400 is aborted and a further landing trial is carried out in a step S16. Alternatively to step S16, a cleared area may be determined based on the signal from the camera device 108 and the aircraft 400 is landed in the cleared area in a step S15'.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An automatic take-off and landing control device for an aircraft, the control device comprising:
    at least one of a radar-based tracking device or a pseudo-lite system based tracking device, the radar-based tracking device and the pseudo-lite system based tracking device being adapted for receiving at least one local signal from at least one local ground station and for determining a position of the aircraft based on the at least one local signal, and at least one of:
    at least one GNSS tracking device adapted for receiving a GNSS signal and for determining a position of the aircraft based on the GNSS signal,
    at least one camera device adapted for observing an environment of the aircraft and for determining a position of the aircraft based on the camera signal;
    at least one monitoring device adapted for continuously supervising a performance and a health status of the at least one radar-based or pseudo-lite system based tracking device based on analyzing signals received from the radar-based or pseudo-lite system based tracking device, one of the at least one GNSS tracking device, and the at least one camera device; and
    wherein the camera device is adapted for determining the position of the aircraft if the local tracking device and the GNSS tracking device are unavailable.

2. The automatic take-off and landing control device according to claim 1,
    wherein the monitoring device is adapted for comparing the position of the aircraft as determined based on signals from at least two of the at least one radar-based or pseudo-lite system based tracking device, the at least one GNSS tracking device, and the at least one camera device.

3. The automatic take-off and landing control device according to claim 1,
    wherein the monitoring device is adapted for determining a lateral displacement of the aircraft with respect to a longitudinal extension of a runway from signals received from at least one of the at least one radar-based or pseudo-lite system based tracking device, the at least one GNSS tracking device, and the at least one camera device.

4. The automatic take-off and landing control device according to claim 1,
    wherein the monitoring device is adapted for determining a threshold lateral displacement value of a lateral displacement of the aircraft with respect to a longitudinal extension of a runway,
    wherein a take-off or landing of the aircraft is carried out fully automatically based on the signal from at least one of the at least one radar-based or pseudo-lite system based tracking device, the at least one GNSS tracking device, and the at least one camera device if a lateral displacement of the aircraft with respect to the longitudinal extension of the runway determined based on the signal from at least one of the at least one radar-based or pseudo-lite system based tracking device, the at least one GNSS tracking device and the at least one camera device is smaller than the threshold lateral displacement value; and
    wherein a landing trial of the aircraft is aborted if the lateral displacement of the aircraft with respect to the longitudinal extension of the runway determined based on the signal from the at least one radar-based or pseudo-lite system based tracking device, the at least one GNSS tracking device, and the at least one camera device exceeds the threshold lateral displacement value.

5. The automatic take-off and landing control device according to claim 4,
    wherein a further landing trial is carried out if the landing trial is aborted.

6. The automatic take-off and landing control device according to claim 1,
    wherein the at least one camera device is adapted for observing the environment of the aircraft in a forward and/or a downward direction of the aircraft, and
    wherein the at least one camera device comprises an optical and/or an infrared camera.

7. The automatic take-off and landing control device according to claim 1,
    wherein the at least one GNSS tracking device comprises at one of a military and a civil-certified GNSS unit.

8. The automatic take-off and landing control device according to claim 1,
    wherein the at least one GNSS tracking device is adapted for receiving a differential correction signal for the GNSS signal from at least one Ground-Based Augmentation System or at least one Space-Based Augmentation System.

9. The automatic take-off and landing control device according to claim 1, further comprising
    at least one altimeter adapted for determining an altitude of the aircraft above a ground level,
    wherein the altimeter is an altimeter selected from a group of Radar altimeter, barometric altimeter, and Laser altimeter.

10. An aircraft comprising the automatic take-off and landing control device according to claim 1,
- at least one radar-based or pseudo-lite system based tracking device adapted for receiving at least one local signal from at least one local ground station and for determining a position of the aircraft based on the local signals,
- at least one GNSS tracking device adapted for receiving a GNSS signal and for determining a position of the aircraft based on the GNSS signal,
- at least one camera device adapted for observing an environment of the aircraft and for determining a position of the aircraft based on the camera signal; and
- at least one monitoring device adapted for continuously supervising a performance and/or a health status of at least two of the at least one radar-based or pseudo-lite system based tracking device, the at least one GNSS tracking device, and the at least one camera device based on analyzing signals received from at least two of the at least one radar-based or pseudo-lite system based tracking device, the at least one GNSS tracking device, and the at least one camera device.

11. The aircraft according to claim 10,
wherein the aircraft is an Unmanned Air Vehicle and/or a Remotely Piloted Aircraft.

12. A method for taking-off or landing an aircraft comprising at least one radar-based or pseudo-lite system based tracking device, at least one of: at least one GNSS tracking device, at least one camera device; wherein the camera device is adapted for determining the position of the aircraft if the local tracking device and the GNSS tracking device are unavailable; and further comprising at least one monitoring device, the method comprising:
- receiving at least one signal from at least two of the at least one radar-based or pseudo-lite system based tracking device, the at least one GNSS tracking device, and the at least one camera device;
- analyzing the signals received from at least two of the at least one radar-based or pseudo-lite system based tracking device, the at least one GNSS tracking device, and the at least one camera device;
- comparing at least two positions of the aircraft determined based on signals from at least two of the at least one radar-based or pseudo-lite system based tracking device, the at least one GNSS tracking device, and the at least one camera device;
- determining a lateral displacement of the aircraft with respect to a longitudinal extension of a runway based on signals from at least one of the at least one radar-based or pseudo-lite system based tracking device, the at least one GNSS tracking device and the at least one camera device;
- determining a threshold lateral displacement value of the aircraft with respect to the longitudinal extension of the runway;
- comparing the lateral displacement of the aircraft with the threshold lateral displacement value; and
- taking-off or landing the aircraft.

13. The method according to claim 12,
wherein taking-off or landing the aircraft is carried out fully automatically based on the signal received from at least one of the at least one radar-based or pseudo-lite system based tracking device, the at least one GNSS tracking device, and the at least one camera device if the lateral displacement determined based on the signals from at least one of the at least one radar- based or pseudo-lite system based tracking device, the at least one GNSS tracking device, and the at least one camera device is smaller than the threshold lateral displacement value.

14. The method according to claim 12,
wherein a landing trial of the aircraft is aborted if the lateral displacement determined based on signals from at least one of the at least one radar-based or pseudo-lite system based tracking device, the at least one GNSS tracking device, and the at least one camera device exceeds the threshold lateral displacement value and if the aircraft is above a threshold height for a go-around maneuver,
wherein a take-off of the aircraft is aborted if the lateral displacement determined based on signals from at least one of the at least one radar-based or pseudo-lite system based tracking device, the at least one GNSS tracking device, and the at least one camera device exceeds the threshold lateral displacement value and if an aircraft speed is below a take-off decision speed.

* * * * *